US010825282B2

(12) United States Patent
Zhang et al.

(10) Patent No.: US 10,825,282 B2
(45) Date of Patent: Nov. 3, 2020

(54) COIN SELECTOR HOLDER FOR A COMMERCIAL APPLIANCE AND COMMERCIAL APPLIANCE

(71) Applicant: Qingdao Haier Drum Washing Machine Co., Ltd., Shandong (CN)

(72) Inventors: Pengcheng Zhang, Shandong (CN); Yunpeng Sun, Shandong (CN); Chunfeng Zhang, Shandong (CN); Tao Zhang, Shandong (CN)

(73) Assignee: Qingdao Haier Drum Washing Machine Co., Ltd., Shandong (CN)

( * ) Notice: Subject to any disclaimer, the term of this patent is extended or adjusted under 35 U.S.C. 154(b) by 0 days.

(21) Appl. No.: 16/464,726

(22) PCT Filed: Nov. 30, 2017

(86) PCT No.: PCT/CN2017/114070
§ 371 (c)(1),
(2) Date: May 29, 2019

(87) PCT Pub. No.: WO2018/009944
PCT Pub. Date: Jun. 7, 2018

(65) Prior Publication Data

US 2019/0347890 A1 Nov. 14, 2019

(30) Foreign Application Priority Data

Nov. 30, 2016 (CN) .......................... 2016 1 1081962

(51) Int. Cl.
*G06F 9/06* (2006.01)
*G07F 17/20* (2006.01)
(Continued)

(52) U.S. Cl.
CPC ................ *G07F 9/06* (2013.01); *D06F 34/34* (2020.02); *D06F 58/20* (2013.01); *G07F 9/00* (2013.01); *G07F 17/20* (2013.01)

(58) Field of Classification Search
CPC ... G07F 9/00; G07F 9/06; G07F 17/20; D06F 34/28; D06F 34/34; D06F 28/28;
(Continued)

(56) References Cited

U.S. PATENT DOCUMENTS 3,276,835 A * 10/1966 Hall .......................... G07F 9/06 312/333
3,547,344 A * 12/1970 Christensen .............. G07F 9/06 232/43.2
(Continued)

FOREIGN PATENT DOCUMENTS

CN 202976311 U 6/2013
CN 204390363 U 6/2015
(Continued)

*Primary Examiner* — Jonathan Liu
*Assistant Examiner* — Guang H Guan
(74) *Attorney, Agent, or Firm* — Burns & Levinson, LLP; Joseph M. Maraia

(57) ABSTRACT

A coin selector holder for a commercial home appliance is provided. The coin selector holder includes a body mounted on a control panel of the commercial home appliance and provided with a mounting groove opening, a first supporting arm arranged on a first side of the mounting groove opening and fastened to the control panel in a bending manner, and a second supporting arm, arranged on a second side of the mounting groove opening. After the first supporting arm is fastened on the control panel, the second supporting arm is clamped to the control panel, and is slideable along the control panel during the clamping process. A commercial appliance including the coin selector holder for the commercial home appliance is provided.

7 Claims, 7 Drawing Sheets

(51) Int. Cl.

| | |
|---|---|
| ***D06F 34/34*** | (2020.01) |
| ***D06F 58/20*** | (2006.01) |
| ***G07F 9/06*** | (2006.01) |
| ***G07F 9/00*** | (2006.01) |

(58) Field of Classification Search

CPC .......... D06F 28/34; D06F 39/12; D06F 58/02; D06F 33/00; D06F 58/20

USPC ........ 248/220.21, 220.22, 222.11, 27.1, 906; 312/228; 232/16; 194/350

See application file for complete search history.

(56) References Cited

U.S. PATENT DOCUMENTS

| | | | | |
|---|---|---|---|---|
| 3,842,761 | A * | 10/1974 | Bloom | E05G 1/026 109/59 R |
| 3,851,942 | A * | 12/1974 | Clay | E05C 19/18 312/333 |
| 4,133,419 | A * | 1/1979 | Greenwald | G07F 9/06 194/350 |
| 4,145,978 | A * | 3/1979 | Johnson | E05B 65/02 109/59 R |
| 4,406,358 | A * | 9/1983 | Zahradnik | G07F 9/10 194/350 |
| 4,697,687 | A * | 10/1987 | Wilson | G07F 17/20 194/344 |
| 5,402,476 | A * | 3/1995 | Ohayon | H04M 17/026 379/145 |
| 6,042,001 | A * | 3/2000 | Siler | G07D 11/125 232/30 |
| 6,578,398 | B2 * | 6/2003 | Behunin | E05B 17/142 70/164 |
| 7,410,095 | B2 * | 8/2008 | Selover | G07F 9/06 194/350 |
| 9,196,112 | B2 * | 11/2015 | Heo | D06F 34/28 |
| 10,275,978 | B2 * | 4/2019 | Yang | G07F 9/06 |
| 2019/0347890 | A1 * | 11/2019 | Zhang | D06F 58/20 |

FOREIGN PATENT DOCUMENTS

| | | | |
|---|---|---|---|
| CN | 107059341 | A | 8/2017 |
| CN | 107424344 | A * | 12/2017 |
| CN | 107945421 | A * | 4/2018 |

* cited by examiner

COIN SELECTOR HOLDER FOR A COMMERCIAL APPLIANCE AND COMMERCIAL APPLIANCE

CROSS REFERENCE TO RELATED APPLICATIONS

This application is a United States national phase application of co-pending international patent application number PCT/CN2017/114070, filed on Nov. 30, 2017 which claims priority to Chinese patent application No. 201611081962.X filed on Nov. 30, 2016, disclosures of both of which are incorporated herein by reference in their entireties.

TECHNICAL FIELD

The present disclosure relates to the technical field of commercial home appliance fittings, for example, a coin selector holder for commercial appliance and a commercial appliance.

BACKGROUND

The combination mode of the commercial washing machine in the related art is to stack the dryer above the washing machine. Once the operator wants to replace the card reader of the washing machine, the only way for replacing is to remove the dryer above, and then to disassemble the whole control panel and countertop of the washing machine. Due to the large size and weight of the commercial drum washing machine, the movement and installation is very difficult, and usually takes two or three people to complete, which wastes time and labor costs. Moreover, the coin selector of the traditional commercial washing machine is mounted by fastening the coin selector with the control panel via the screws. Once the coin selector has problems, the only way for maintenance is to completely disassemble the whole control panel of the washing machine, which also involves problems of replacement and maintenance difficulties.

SUMMARY

A coin selector holder for a commercial home appliance is provided by the present disclosure, solving the problems with replacement and maintenance difficulties of the coin selector or the card reader for the commercial home appliance, and high labor costs in the related art.

A commercial home appliance provided by the present disclosure includes the coin selector holder for the commercial home appliance, solving the problems with replacement and maintenance difficulties of the coin selector or the card reader in the related art.

A coin selector holder for a commercial home appliance includes:

a body, mounted on a control panel of the commercial home appliance and provided with a mounting groove opening;

a first supporting arm, arranged on a first side of the mounting groove opening and fastened to the control panel in a bending manner;

a second supporting arm, arranged on a second side of the mounting groove opening.

After the first supporting arm is fastened on the control panel, the second supporting arm is clamped to the control panel, and is slideable along the control panel during a clamping process.

Optionally, the first supporting arm includes a first bending plate bent toward an inside of the control panel, and a second bending plate tilted at an angle $\alpha$ relative to the first bending plate. The second bending plate is arranged toward the body, and the second bending plate and the first bending plate are cooperated each other to be fastened to the control panel.

Optionally, the angle $\alpha$ is an obtuse angle and is in a range of 100° to 130°.

Optionally, the second supporting arm includes a third bending plate bent toward a bottom of an inside of the control panel. One end of the third bending plate toward the first supporting arm is provided with a fourth bending plate. One end of the fourth bending plate without connecting with the third bending plate is arranged away from the body. An angle $\beta$ is formed at a bending joint between the third bending plate and the fourth bending plate.

Optionally, the angle $\beta$ is an obtuse angle and is in a range of 160° to 165°.

Optionally, the control panel is provided with a groove consistent with a shape of the body. A groove opening is arranged in the groove. The body is mounted in the groove.

Optionally, the groove is provided with a mounting gap. The second supporting arm is clamped to the control panel through the mounting gap, and the fourth bending plate slides relative to a side wall of the mounting gap during the clamping process.

Optionally, the body is further provided with a safety lock located on one side of the mounting groove opening.

A commercial home appliance is further provided by the present disclosure, including a coin selector holder for a commercial home appliance above.

Optionally, the commercial home appliance is a washing machine or a dryer.

In the present disclosure, the coin selector (also card reader) can be replaced and maintained just by disassembling and assembling the coin selector holder, without moving the dryer and disassembling the control panel, which is simple and efficient.

1—body; 11—mounting groove opening; 12—through hole; 13—supporting plate; 14—safety lock mounting hole;

2—control panel; 21—groove; 22—groove opening; 23—mounting gap;
3—first supporting arm; 31—first bending plate; 32—second bending plate;
4—second supporting arm; 41—third bending plate; 42—fourth bending plate;
5—safety lock;
6—coin selector;
10—coin selector holder.

DETAILED DESCRIPTION

A coin selector holder for commercial home appliance is provided by the present embodiment, which is used for installing coin selector. As shown in FIG. 1 to FIG. 7, the coin selector holder includes a body 1, a first supporting arm 3 and a second supporting arm 4 which are arranged on the body 1.

Figure 4:
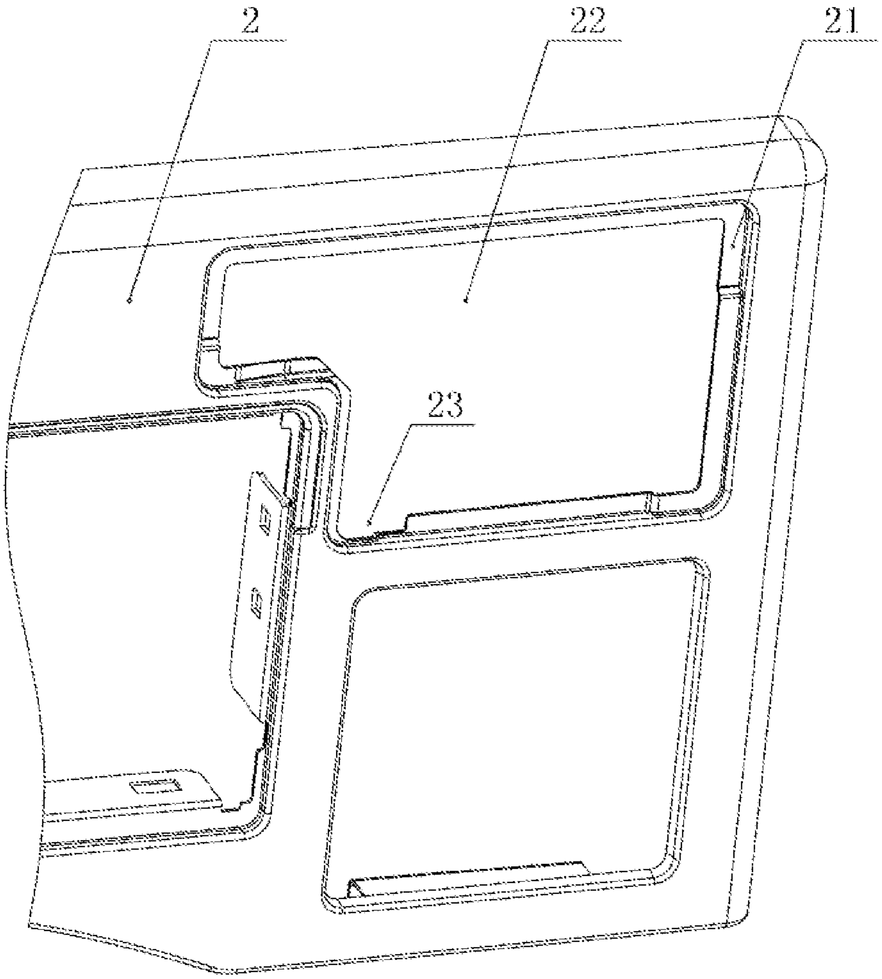
FIG. 4 is a structural schematic diagram of a control panel provided by one embodiment.

The body 1 is mounted on the control panel 2 of the commercial home appliance. Optionally, as shown in FIG. 4, a groove 21 is punched on the control panel 2. A groove opening 22 is formed in the groove 21. The body 1 is embedded in the groove 21, and stalled on the control panel 2 through the first supporting arm 3 and the second supporting arm 4. Optionally, a shape of the groove 21 is consistent with a shape of the body 1, so that an outer surface of the body 1 and an outer surface of the control panel 2 are on the same plane when the body 1 is embedded in the groove 21, which improves the aesthetics of the entire commercial appliance.

A mounting groove opening 11 is punched on the body 1, and formed by the process in which a mounting groove is arranged on the body 1 and then a hole is cut in the mounting groove. A shape of the mounting groove opening 11 is the same as the coin selector 6. The coin selector 6 is mounted in the body 1 through the mounting groove opening 11. Optionally, a through hole 12 is arranged at an edge of the mounting groove opening 11. When mounting the coin selector 6, the coin selector 6 is embedded in the mounting groove opening 11, and then a bolt passes through the through hole 12 to screw connect the coin selector 6, so that the coin selector 6 is mounted on the body 1 of the coin selector holder. Optionally, the mounting groove opening 11 is further provided with two supporting plates 13. When the coin selector 6 is embedded in the mounting groove opening 11, a bottom end of the coin selector 6 is supported by the two supporting plates 13.

Figure 1:
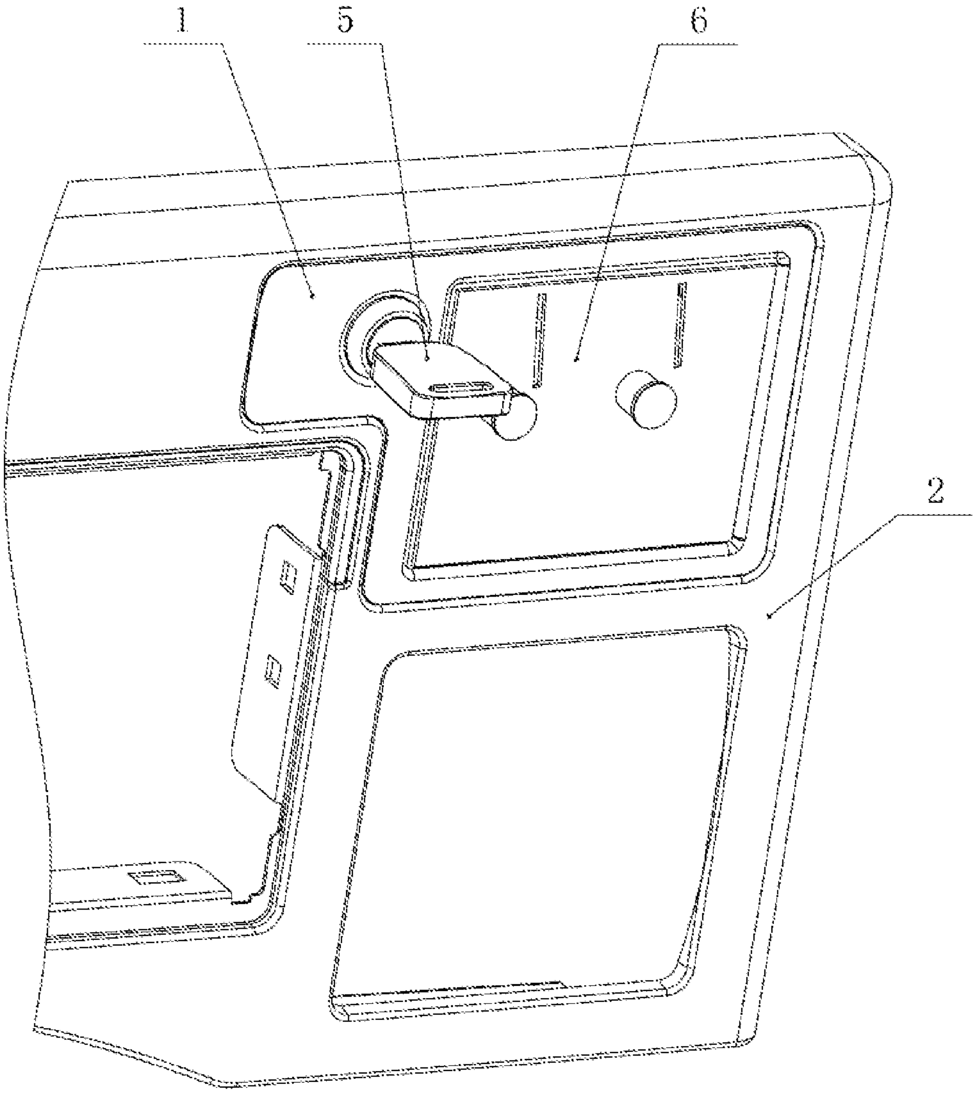
FIG. 1 is a structural schematic diagram of a control panel having both a coin selector and a coin selector holder provided by one embodiment.
Figure 2:
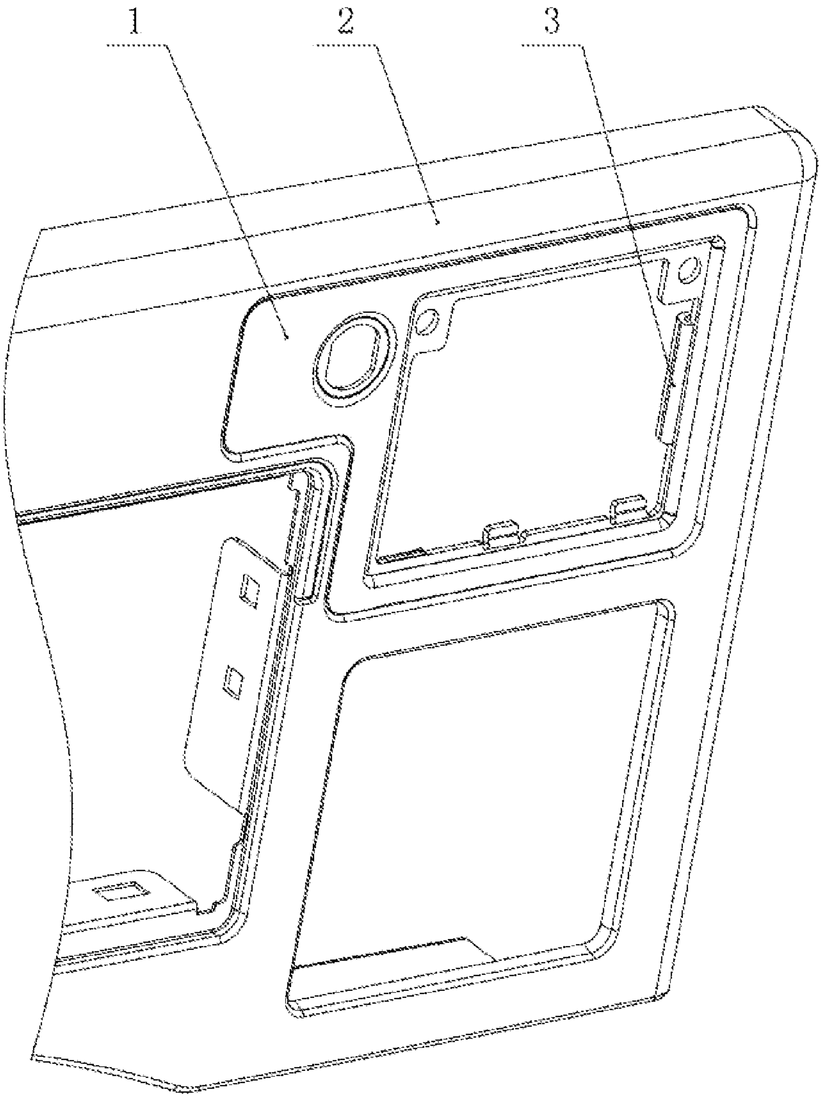
FIG. 2 is a front structural schematic diagram of a control panel having both a coin selector and a coin selector holder provided by one embodiment.
Figure 5:
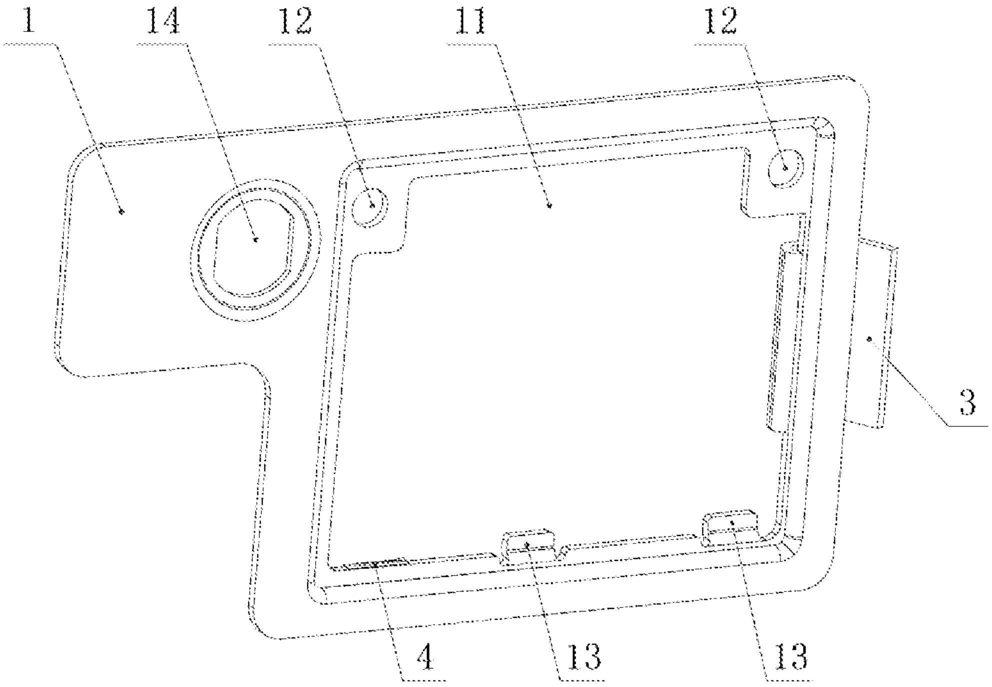
FIG. 5 is a front structural schematic diagram of a coin selector holder for commercial appliance provided by one embodiment.
Figure 6:
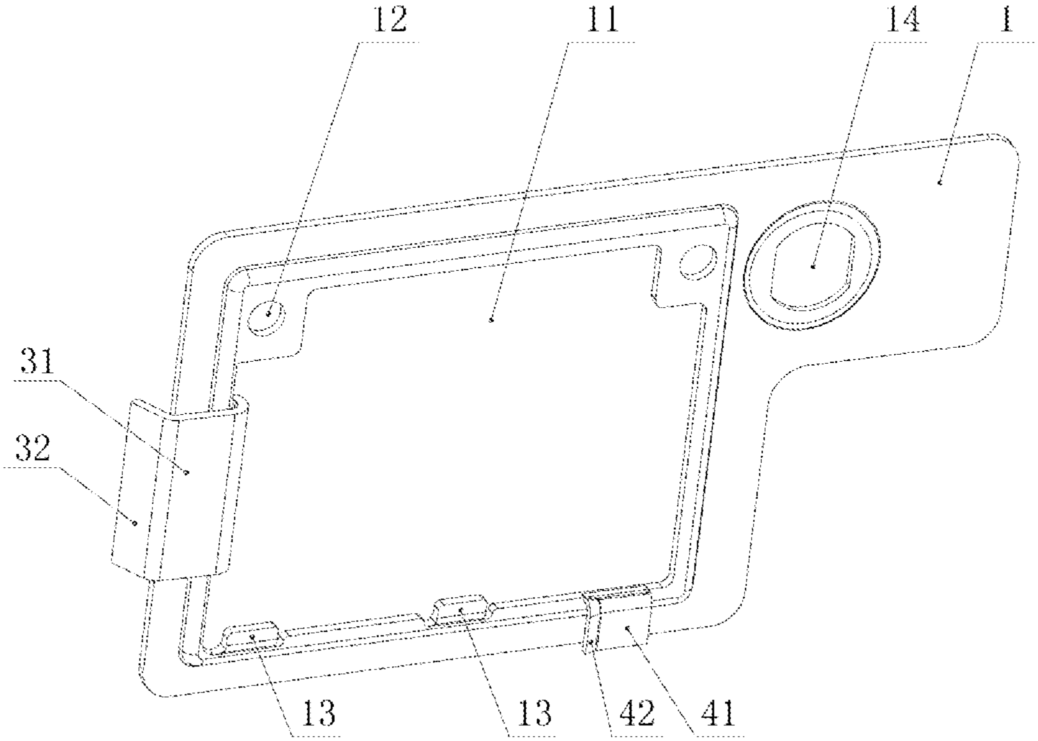
FIG. 6 is a rear structural schematic diagram of a coin selector holder for commercial appliance provided by one embodiment.

In the present embodiment, as shown in FIG. 5 and FIG. 6, the body 1 is further provided with a safety lock mounting hole 14. The safety lock mounting hole 14 is arranged near the mounting groove opening 11, and configured for mounting a safety lock 5 (as shown in FIG. 1). The reason why the safety lock mounting hole 14 is arranged near the mounting groove opening 11 is to provide a space for rotation of the lock tongue of the safety lock 5 when mounting safety lock 5.

Figure 3:
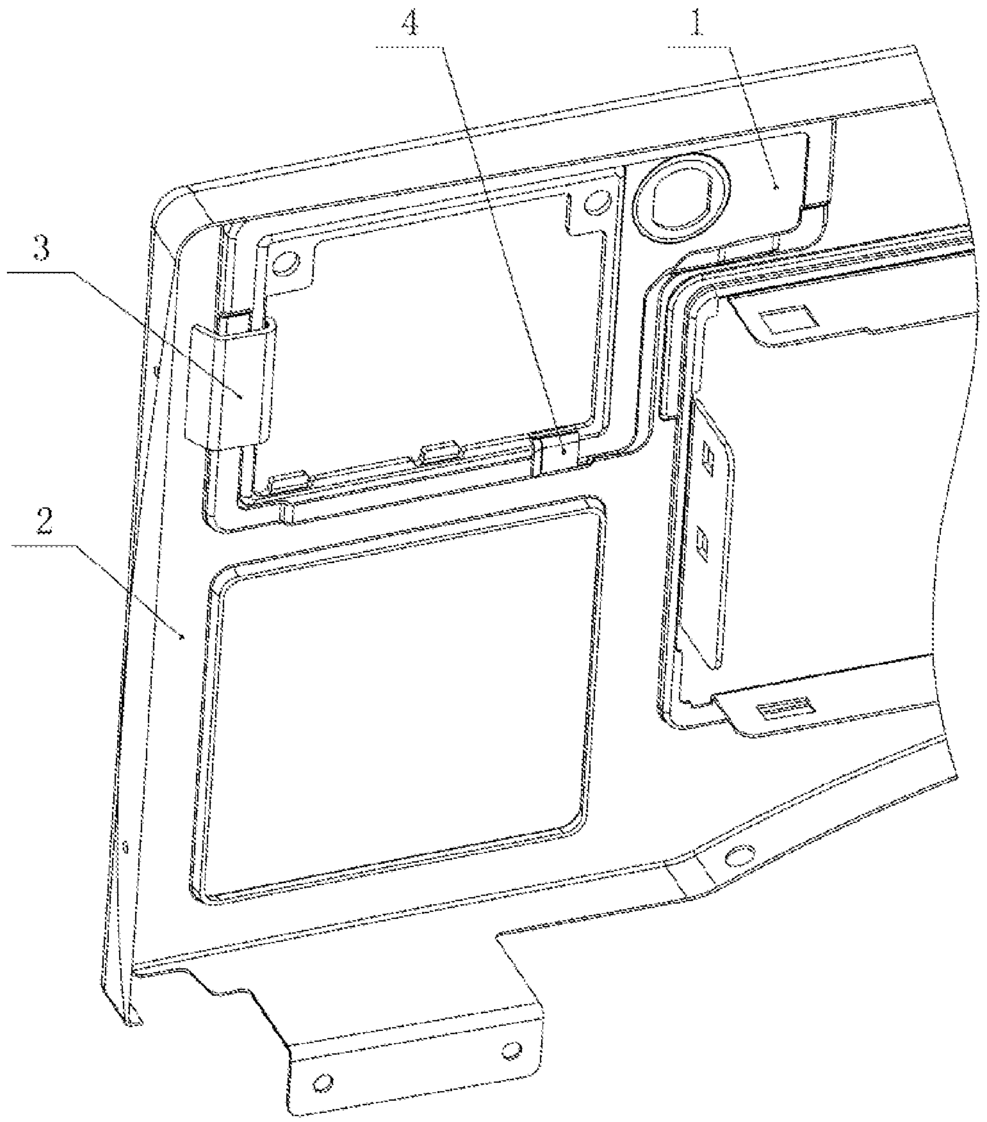
FIG. 3 is a rear structural schematic diagram of a control panel having both a coin selector and a coin selector holder provided by one embodiment.
Figure 7:
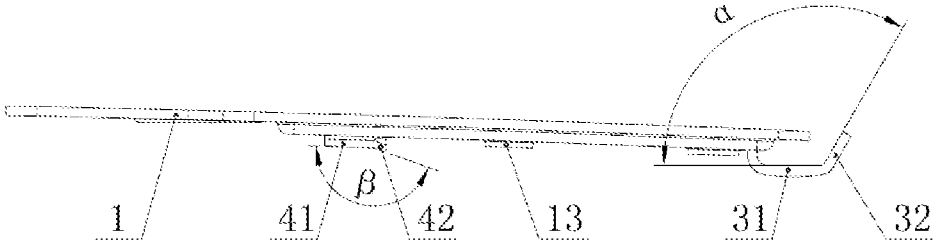
FIG. 7 is a top view of a coin selector holder for commercial appliance provided by one embodiment.

As shown in FIG. 3, FIG. 6 and FIG. 7, the first supporting arm is arranged on a first side of the mounting groove opening 11, and fastened to the control panel 2 in a bent manner. Optionally, the first supporting arm 3 includes a first bending plate 31 (the left side in FIG. 3) bent toward an inside of the groove 21 of the control panel 2, and a second bending plate 32 tilted at an angle $\alpha$ relative to the first bending plate 31. The second bending plate 32 is arranged toward the body 1, and the second bending plate (32) and the first bending plate (31) are cooperated each other, so that the first supporting arm 3 is fastened to the control panel 2. In the present embodiment, the angle $\alpha$ is an obtuse angle, and the opening of the angle $\alpha$ is arranged toward the body 1. The angle $\alpha$ is in a range of 100° to 130°. The arrangement of the angle enables the first supporting arm to be fastened to the control panel 2.

The second supporting arm 4 is located on a second side of the mounting groove opening 11. The second supporting arm 4 is clamped to the control panel 2 (as shown in FIG. 3), and is slideable along the control panel 2 during the clamping process. Optionally, the second side is arranged adjacent to the first side having the first supporting arm 3. As shown in FIG. 6 and FIG. 7, the second supporting arm 4 includes a third bending plate 41 bent toward a bottom of the inside of the control panel 2 (as shown in FIG. 6). One end of the third bending plate 41 toward the first supporting arm 3 is provided with a fourth bending plate 42. One end of the fourth bending plate 42 without connecting with the third bending plate 41 is arranged away from the body 1. an angle $\beta$ is formed at a bending joint between the fourth bending plate 42 and the third bending plate 41. When the coin selector holder is mounted, the second supporting arm may be clamped to the control panel 2 through the third bending plate 41 and the fourth bending plate 42, and the second arm 4 may slide a certain distance toward the first supporting arm 3 through the fourth bending plate 42, so that the entire body 1 of the coin selector is embedded in the groove 21 of the control panel 2.

Optionally, the angle $\beta$ is an obtuse angle, and the opening of the angle $\beta$ is arranged away from the body 1. The angle $\beta$ is in a range of 160° to 165°, so that the second supporting arm 4 is clamped to the control panel 2.

In the present embodiment, as shown in FIG. 4, the groove 21 of the control panel 2 is provided with a mounting gap 23. The second supporting arm 4 is clamped to the control panel 2 through the mounting gap 23, and the fourth bending plate 42 slides relative to a side wall of the mounting gap 23 during the clamping process.

In the present embodiment, when the coin selector holder is mounted, firstly, the coin selector 6 and the safety lock 5 are mounted on the coin selector holder. The coin selector holder mounted with the coin selector 6 and safety lock 5 is titled by an angle. Optionally, the angle is in a range of 20° to 30°. One end of the coin selector holder 3 provided with the first supporting arm 3 is placed in the groove opening 22 of the control panel 2.

The first bending plate 31 of the first supporting arm 3 is firstly in contact with the control panel 2. And then the coin selector holder is rotated with the first supporting arm 3 as a circle center. During the rotation, one end of the coin selector holder provided with the second supporting arm 4 gradually approaches the groove 21 of the control panel 2, until the fourth bending plate 42 of the second supporting arm 4 is aligned with the mounting gap 23; while the fourth bending plate 42 is in contact with a first side of the mounting gap 23 and slides a distance relative to the first side of the mounting gap 23, until the first supporting arm 3 is fastened to the control panel 2. Optionally, the distance is in a range of 10 mm to 15 mm.

It should be noted that the coin selector holder may also be configured for mounting a card reader, as long as the shape of the card reader panel is fitted with the coin selector holder for the commercial appliance provided by the present embodiment.

Figure 8:
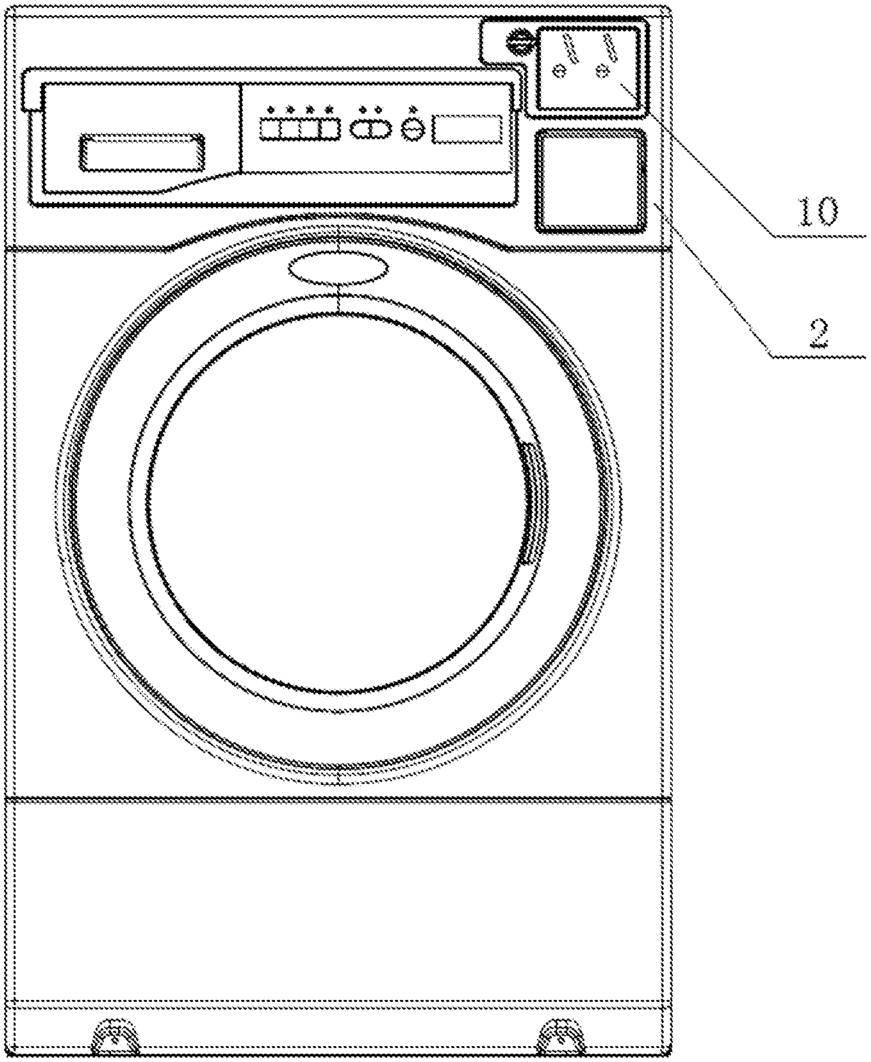
FIG. 8 is a structural schematic diagram of a commercial appliance provided by one embodiment.

A commercial home appliance is further provided by the present embodiment. As shown in FIG. 8, the commercial home appliance includes the coin selector holder 10 for the commercial appliance. The coin selector holder 10 is arranged to make the replacement and maintenance of the coin selector 6 or the card reader simple and easy to operate, that is, the operation may be completed by disassembling the control panel. Optionally, the commercial home appliance is a washing machine or a dryer.

INDUSTRIAL APPLICABILITY

A coin selector holder for a commercial home appliance in the present disclosure remove the step of moving a dryer and disassembling a control panel during the replacement and maintenance of the coin selector (also a card reader), thereby making the replacement and maintenance of the coin selector easier and more efficient.

What is claimed is:

1. A coin selector holder applied in a commercial home appliance, the commercial home appliance comprising a control panel, wherein the control panel is provided with a groove, a groove opening is arranged in the groove, and the groove is provided with a mounting gap, the coin selector holder comprising:

a body mounted on the control panel and provided with a mounting groove opening;

a first supporting arm arranged on a first side of the mounting groove opening and fastened to the control panel in a bending manner;

a second supporting arm arranged on a second side of the mounting groove opening;

wherein, after the first supporting arm is fastened on the control panel, the second supporting arm is clamped to the control panel, and is slideable along the control panel during a clamping process;

wherein the second supporting arm comprises a first bending plate bent toward a bottom of an inside of the control panel; one end of the first bending plate toward the first supporting arm is provided with a second bending plate; one end of the second bending plate without directly connecting with the first bending plate is arranged away from the body; a first angle (β) is formed at a bending joint between the first bending plate and the second bending plate;

wherein the first angle (β) is an obtuse angle and is in a range of 160° to 165°;

wherein a shape of the body is consistent with the groove of the control panel, and the body is mounted in the groove of the control panel; and wherein the second supporting arm is clamped to the control panel and located in the mounting gap of the control panel, and the second bending plate slides relative to a side wall of the mounting gap during the clamping process.

2. The coin selector holder according to claim 1, wherein the first supporting arm comprises a third bending plate bent toward the inside of the control panel, and a fourth bending plate tilted at a second angle (α) relative to the third bending plate; the fourth bending plate is arranged toward the body, and the fourth bending plate and the third bending plate are cooperating with each other to be fastened to the control panel.

3. The coin selector holder according to claim 2, wherein the second angle (α) is an obtuse angle and is in a range of 100° to 130°.

4. The coin selector holder according to claim 1, wherein the body is further provided with a safety lock located on a third side of the mounting groove opening.

5. A commercial home appliance, comprising a coin selector holder and a control panel, wherein the commercial home appliance is a washing machine or a dryer, wherein the control panel is provided with a groove, a groove opening is arranged in the groove, and the groove is provided with a mounting gap, wherein the coin selector holder comprises:

a body mounted on the control panel and provided with a mounting groove opening;

a first supporting arm arranged on a first side of the mounting groove opening and fastened to the control panel in a bending manner;

a second supporting arm arranged on a second side of the mounting groove opening;

wherein after the first supporting arm is fastened on the control panel, the second supporting arm is clamped to the control panel, and is slideable along the control panel during a clamping process;

wherein the second supporting arm comprises a first bending plate bent toward a bottom of an inside of the control panel; one end of the first bending plate toward the first supporting arm is provided with a second bending plate; one end of the second bending plate without directly connecting with the first bending plate is arranged away from the body; a first angle (β) is formed at a bending joint between the first bending plate and the second bending plate;

wherein the first angle (β) is an obtuse angle and is in a range of 160° to 165°;

wherein a shape of the body is consistent with the groove of the control panel, and the body is mounted in the groove of the control panel;

wherein the second supporting arm is clamped to the control panel and located in the mounting gap of the control panel, and the second bending plate slides relative to a side wall of the mounting gap during the clamping process.

6. The commercial home appliance according to claim 5, wherein the first supporting arm comprises a third bending plate bent toward the inside of the control panel, and a fourth bending plate tilted at a second angle (α) relative to the third bending plate; the fourth bending plate is arranged toward the body, and the fourth bending plate and the third bending plate are cooperating with each other to be fastened to the control panel.

7. The commercial home appliance according to claim 6, wherein the second angle (α) is an obtuse angle and is in a range of 100° to 130°.

* * * * *